(12) United States Patent
Isendam et al.

(10) Patent No.: US 6,523,865 B2
(45) Date of Patent: Feb. 25, 2003

(54) HIGH GRIP PIPE CONNECTION AND GASKET

(75) Inventors: Jules Isendam, Etobicoke; Michael Brunt, Newmarket; Wayne Gooderham, Etobicoke, all of (CA)

(73) Assignee: Uniflex, Ontario (CA)

( * ) Notice: Subject to any disclaimer, the term of this patent is extended or adjusted under 35 U.S.C. 154(b) by 4 days.

(21) Appl. No.: 09/911,137

(22) Filed: Jul. 23, 2001

(65) Prior Publication Data
US 2002/0101080 A1 Aug. 1, 2002

Related U.S. Application Data
(60) Provisional application No. 60/264,437, filed on Jan. 26, 2001.

(51) Int. Cl.⁷ ................................................ F16L 17/02
(52) U.S. Cl. .................. 285/374; 285/252; 285/236; 285/232
(58) Field of Search ................. 285/374, 231, 285/232, 236, 921, 252

(56) References Cited

U.S. PATENT DOCUMENTS

| | | | | |
|---|---|---|---|---|
| 3,386,745 A | * | 6/1968 | Hein | 277/605 |
| 3,573,871 A | * | 4/1971 | Warner | 277/607 |
| 3,998,478 A | * | 12/1976 | Zopfi | 277/607 |
| 4,111,464 A | * | 9/1978 | Asano et al. | 285/111 |
| 4,474,392 A | * | 10/1984 | Vassallo et al. | 285/347 |
| 4,580,816 A | * | 4/1986 | Campbell et al. | 285/321 |
| 4,790,571 A | * | 12/1988 | Montanari et al. | 285/86 |
| 4,850,602 A | * | 7/1989 | Goldstein et al. | 277/553 |
| 4,875,714 A | * | 10/1989 | Lee | 285/260 |
| 5,129,685 A | * | 7/1992 | Engel | 285/181 |
| 5,649,713 A | * | 7/1997 | Ledgerwood | 277/615 |
| 5,653,452 A | * | 8/1997 | Jarvenkyla | 277/607 |

* cited by examiner

*Primary Examiner*—Eric K. Nicholson
(74) *Attorney, Agent, or Firm*—Bourque & Associates, P.A.

(57) ABSTRACT

A pipe connection includes a first having a male end and a second pipe having a female end and a gasket. The female end has a recess area sized to accept the gasket. The gasket has at least one flexible protrusion extending radially towards the center of the pipe forming a diameter that is less than the diameter of the male end which frictionally engages the male end of the second pipe. Optionally, the female end may include rigid dimples that exert pressure onto the male end to prevent the two pipes from separating. The pipe connection may be used in conjunction with a clamp.

15 Claims, 5 Drawing Sheets

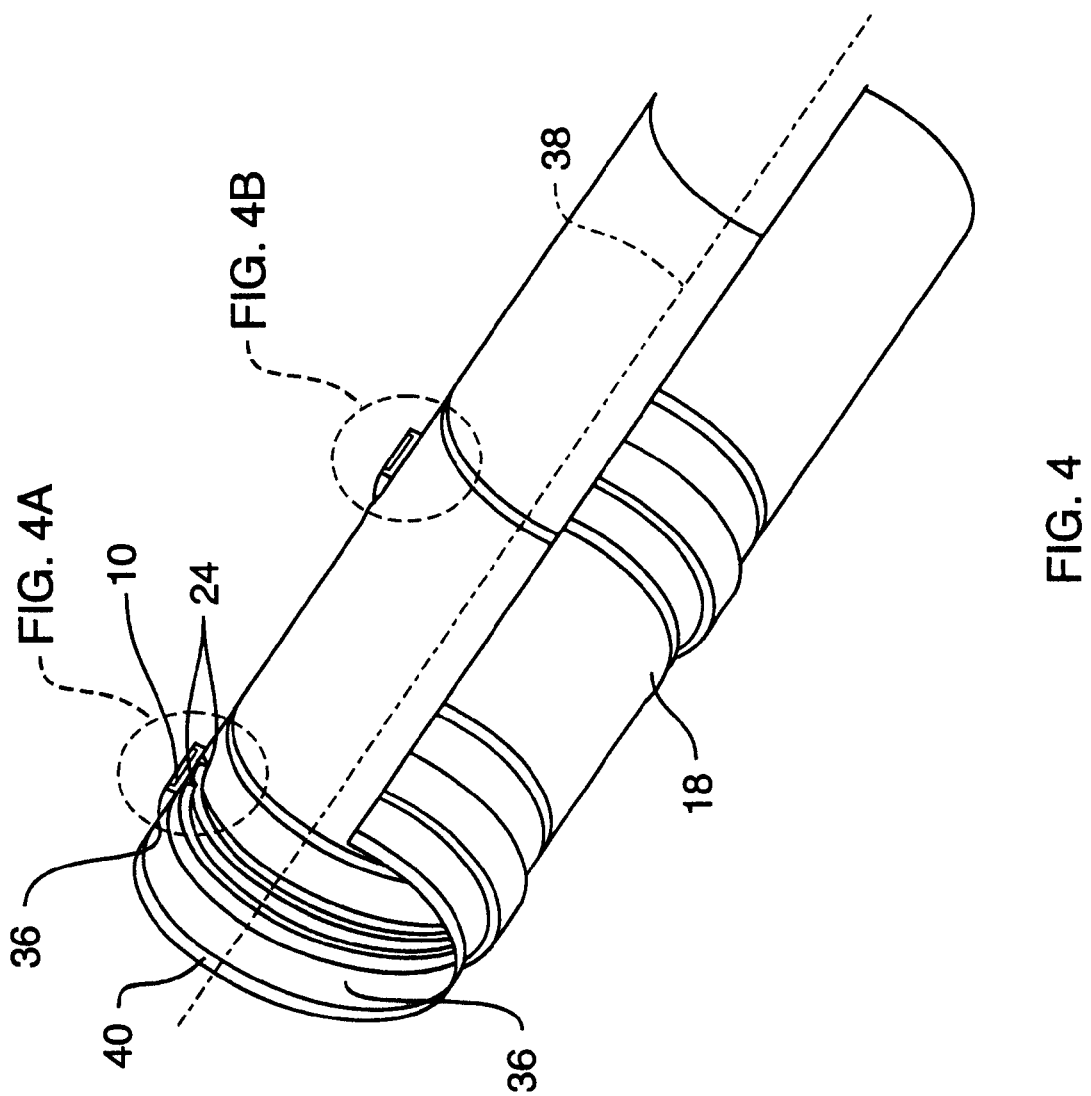

HIGH GRIP PIPE CONNECTION AND GASKET

CROSS-REFERENCE TO RELATED APPLICATIONS

This application is related to and claims the benefit of Provisional U.S. patent application Ser. No. 60/264,437 entitled High Grip Pipe Gasket, filed on Jan. 26, 2001 by the Assignee of the present invention, and incorporated herein by reference.

TECHNICAL FIELD

This invention relates to pipe connections and more particular, to a connection which allows two pipes to be easily mated and which serves to lock them together and prevent the escape of vented gases.

BACKGROUND INFORMATION

There are many different types of pipes that must be joined together. For example, flue pipes for heating appliances such as hot water heaters, furnaces and the like are generally joined together by inserting one pipe into another. In certain situations, venting of some modern heating appliances requires the use of a fan to push the vent gases out under low pressure. Conventional vent pipes with loosely fitting joints will allow gases to escape into the surrounding area.

SUMMARY

The present invention is directed to a system for connecting two pipes including a first pipe having a diameter and a male end and a second pipe having a female end sized to accept the male end and a gasket. The gasket has a plurality of flexible protrusions that engage with the outside surface of the male end. The flexible protrusions may be made out of silicone or a synthetic rubber. The female end also has a recess or channel sized to accept the gasket and allow the flexible protrusions to extend partially onto the outside diameter of the male end. In use, the male end frictionally engages the gasket of the second pipe creating a leak-proof seal which prevents the escape of gases.

In another embodiment, the system may further include at least one rigid protrusion extending partially beyond the diameter of the male end. In yet a further embodiment, the system includes a retaining device such as, but not limited to, a clamp.

BRIEF DESCRIPTION OF THE DRAWINGS

These and any other features and advantages of the present invention will better understood by reading the following detailed description, taken together with the drawings wherein:

FIG. 4 is a cross-sectional schematic view of two mated pipes according to one embodiment of the present invention;

DETAILED DESCRIPTION OF THE PREFERRED EMBODIMENT

Figure 1:
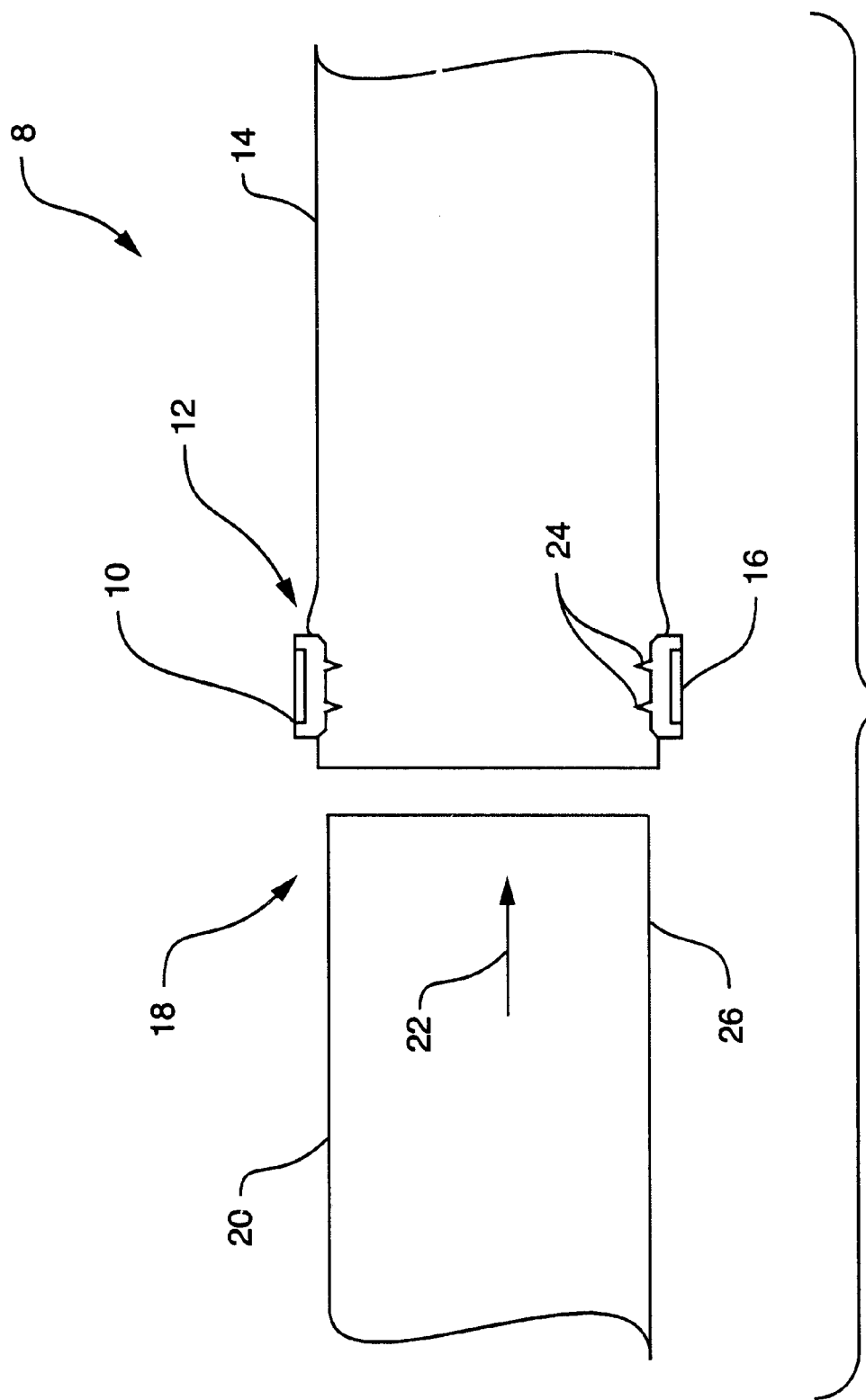
FIG. 1 is a cross-sectional schematic view of two mating pipes with the gasket according to one embodiment of the present invention.

The pipe connection system 8, FIG. 1, according to the present invention, is adapted to mate with male end 18 of pipe 20. Female end 12 of pipe 14 includes a gasket 10. In one embodiment, the pipe 14 is a metal or stainless steel, smooth, thin walled pipe for use in venting low to moderate temperature gases from a heating appliance such as a water heater or furnace. This is not a limitation of the present invention, however, as the connection 8 of the present invention can also be used with plastic or other types of pipe.

In use, the gasket 10 fits into a recess 16 in the female end 12 of the pipe 14. The male end 18 of a first pipe 20 is inserted into the female end 12 in the direction of arrow 22. As will be shown in greater detail below, the gasket 10, according to the present invention, includes two or more "fillets" or areas of protrusion 24 which exert a combined frictional pressure or force against the exterior wall 26 of mating pipe 20. This frictional force maintains pipes 20 and 14 in reasonably tight alignment. However, the friction does not prevent the pipes from being disassembled. Accordingly, in one embodiment, the pipes 14 and 20 are held together by frictional force without the use of external elements such as screws, clamps, bands, or cement. The areas of protrusion 24 also create a generally air-proof and water-proof seal.

Figure 2:
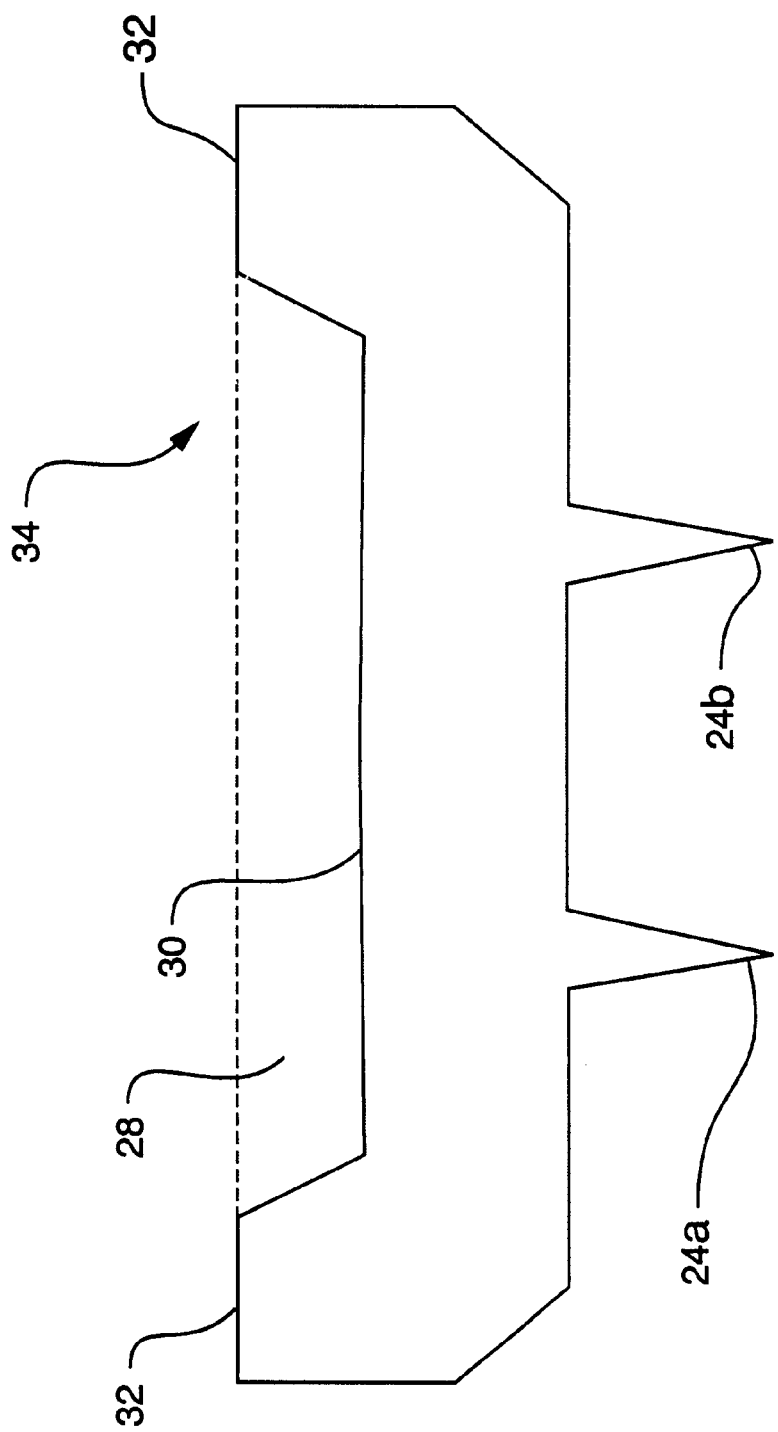
FIG. 2 is a cross-sectional schematic view of the gasket according to one embodiment of the present invention.

The gasket 10 is shown in greater detail in FIG. 2. Although this figure shows various angled configurations of the gasket, the various angles are not a limitation of the present invention. The present invention includes at least a first and a second fillet or protrusion 24, which serve to engage with the exterior surface of wall of a pipe (not shown En this drawing) The size, shape, and height of the fillets or protrusions 24 may be altered as necessary, all without departing from the scope of the present invention.

In one embodiment of the present invention, the gasket 10 includes a void area 28 formed by legs 32 on each end of the underside 34 of the gasket 10. The void area 28 allows the main body portion 30 of the gasket to be depressed or deformed in a downward direction as a pipe is being slid over the fillets or protrusions 24.

In the preferred embodiment, the gasket 10 is made of a material such as silicone, which can withstand high to moderate temperatures often associated with heating systems. Other suitable materials can be used without departing from the spirit of the present invention such as, but not limited to, rubber and other synthetic polymers. In addition, although two fillets or protrusions 24 are shown in the exemplary drawing, this is not a limitation of the present invention as two or more fillets or protrusions 24 may be utilized to suit the needs of the particular application.

For example, additional fillets or protrusions 24 might be utilized for a wide gasket for larger diameter pipes. Larger or various shaped fillets may also be provided without departing from the present invention. The exact shape and number of protrusions 24 Will depend upon the installation requirements, and is within the knowledge of one of ordinary skill in the art.

Figure 3:
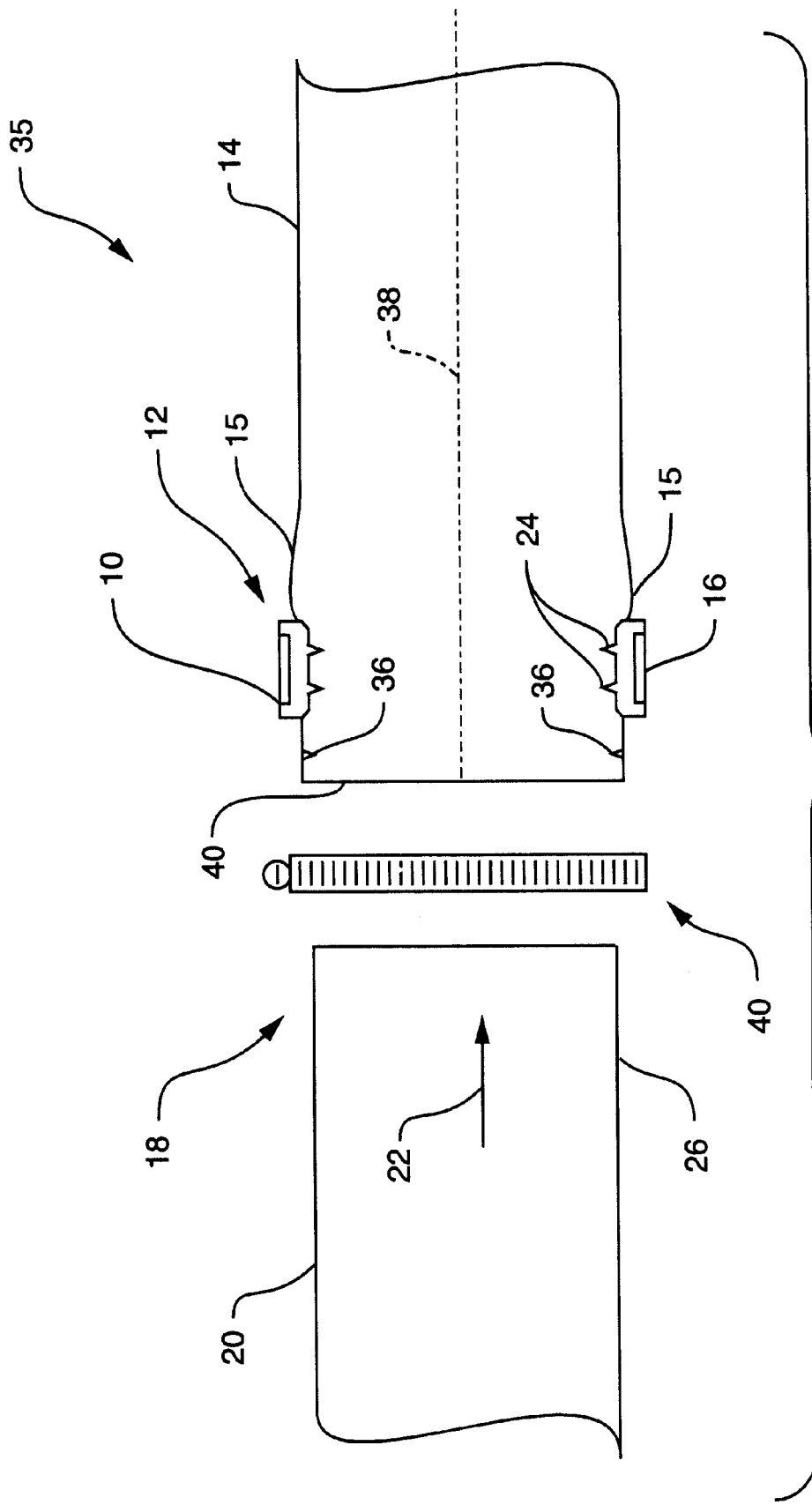
FIG. 3 is a cross-sectional schematic view of two mating pipes with the gasket, clamp, and dimples according to another embodiment of the present invention.

In another embodiment, the pipe connection system 35, FIG. 3, includes a pipe 14 having one or more rigid "dimples" or protrusions 36 extending inward toward the center 38 of the pipe 14. These rigid dimples 36 aid in maintaining the two pipes 14, 20 together. The rigid dimples 36 may be located between the gasket 10 and the end 40 of the pipe 14, (as shown in FIG. 3), or after the gasket 10 in the area indicated generally at 15 (not shown). in one embodiment, the rigid dimples 36 exert pressure onto the male pipe 20 to prevent the two pipes from separating. Optionally, a retaining device 40, such as a clamp, screw, rivet, etc., may be used. The use of a retaining device 40 in conjunction with the rigid dimples 36 and gasket 10 creates a high-strength, leak-proof coupling.

Figure 4B:
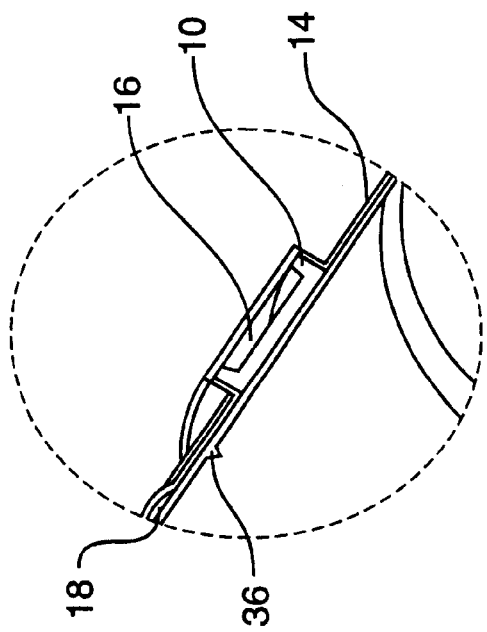
FIG. 4B is an enlarged cross-sectional schematic view of a second end of FIG. 4.
Figure 4A:
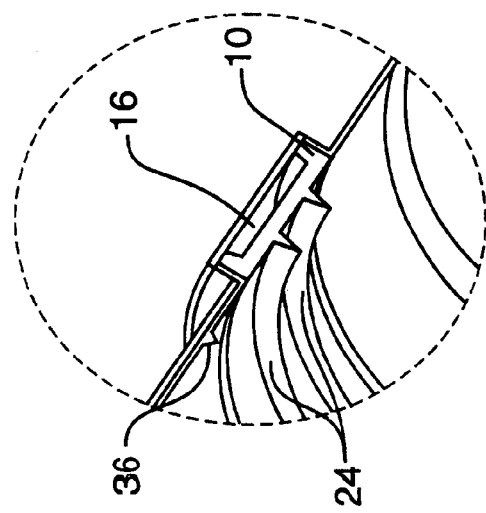
FIG. 4A is an enlarged cross-sectional schematic view of a first end of FIG. 4.

As can be seen better in the embodiment shown in FIGS. 4, 4A, and 4B, the pipe connection system 35 includes the fillets or protrusions 24, FIG. 4A, that extend radially around the circumference of pipe 14 and one or more rigid "dimples" or protrusions 36 extending inward toward the center 38 of the pipe 14. The gasket 10 includes a recess 16, FIG. 4B, which is depressed or deformed when the fillets or protrusions 24 (not visible) engage the male end 18 of a pipe.

modifications and substitutions by one of ordinary skill in the art are considered to be within the scope of the present invention, which is not to be limited except by the following claims.

The invention claimed is:

1. A system for joining two pipes comprising:
a first pipe having a diameter and a male end; and
a second pipe comprising:
  a female end sized to accept said male;
  at least one rigid protrusion forming a diameter which is less than said diameter of said male end and shaped so as to be able to slidingly engage and compress the male diameter during as it is slid into said female end; and
  a gasket having a plurality of flexible protrusions; and a recess within said female end sized to accept said gasket and allow said flexible protrusions to form a diameter which is less than said diameter of said male end, wherein an outside surface of said male end frictionally engages with said plurality of flexible protrusions of said gasket and said rigid protrusion of said second pipe creating a seal.

2. The system as claimed in claim 1 wherein said gasket further includes a void area allowing said gasket to be deformed in a radially outward direction.

3. The system as claimed in claim 2 further comprising a retaining device.

4. The system as claimed in claim 3 wherein said retaining device is a clamp.

5. The system as claimed in claim 1 further comprising a retaining device.

6. The system as claimed in claim 5 wherein said retaining device is a clamp.

7. The system as claimed in claim 1 wherein said gasket is made of silicone.

8. The system as claimed in claim 1 wherein said gasket is made of rubber.

9. The system as claimed in claim 1 wherein said gasket further includes a void area allowing said gasket to be deformed in a radially outward direction as said male end of said first pipe is slide into said female end of said second pipe.

10. A system for joining two pipes comprising:
a first pipe having a diameter and a male end; and
a second pipe comprising:
  a female end sized to accept said male;
  a gasket comprising:
    a plurality of flexible protrusions;
    a void area allowing said gasket to be deformed in a radially outward direction as said male end of said first pipe is slid into said female end of said second pipe; and at least one rigid protrusion forming a diameter which is less than said diameter of said male end and shaped so as to slidingly engage and compress the male diameter as it is slid into said female end; and a recess within said female end sized to accept said gasket and allow said flexible protrusions to form a diameter which is less than said diameter of said male end, wherein an outside surface of said male end frictionally engages with said plurality of flexible protrusions of said gasket and said rigid protrusion of said second pope creating a seal.

11. The system as claimed in claim 10 further comprising a retaining device.

12. The system as claimed in claim 11 wherein said retaining device is a clamp.

13. The system as claimed in claim 10 wherein said gasket is made of silicone.

14. The system as claimed in claim 10 wherein said gasket is made of rubber.

15. A system for joining two pipes comprising:
a first pipe having a diameter and a male end; and
a second pipe comprising:
  a female end sized to accept said male end of said first pipe; and
  at least one rigid protrusion forming a diameter which is less than said diameter of said male end and shaped so as to be able to slidingly engage and compress the male diameter during assembly; and
  wherein an outside surface of said male end frictionally engages with said at least one rigid protrusion of said second pipe creating a generally secure connection between said first and second pipe.

* * * * *